United States Patent
Budike, Jr.

(10) Patent No.: US 7,167,777 B2
(45) Date of Patent: Jan. 23, 2007

(54) WIRELESS INTERNET LIGHTING CONTROL SYSTEM

(75) Inventor: Lothar E. S. Budike, Jr., Newton Square, PA (US)

(73) Assignee: Powerweb Technologies, Media, PA (US)

( * ) Notice: Subject to any disclaimer, the term of this patent is extended or adjusted under 35 U.S.C. 154(b) by 156 days.

(21) Appl. No.: 10/700,058

(22) Filed: Nov. 4, 2003

(65) Prior Publication Data

US 2005/0097162 A1   May 5, 2005

(51) Int. Cl.
G05D 9/00 (2006.01)
(52) U.S. Cl. ............ 700/297; 709/201; 315/292; 315/307; 370/254
(58) Field of Classification Search ........... 700/277, 700/297, 284; 709/201; 340/5.64, 22, 825; 315/324, 315, 292, 307; 370/254
See application file for complete search history.

(56) References Cited

U.S. PATENT DOCUMENTS

| | | | | |
|---|---|---|---|---|
| 5,381,078 A | * | 1/1995 | Szuba | 315/316 |
| 5,471,119 A | * | 11/1995 | Ranganath et al. | 315/307 |
| 5,909,429 A | * | 6/1999 | Satyanarayana et al. | 370/254 |
| 6,181,086 B1 | * | 1/2001 | Katyl et al. | 315/307 |
| 6,507,158 B1 | * | 1/2003 | Wang | 315/294 |
| 6,608,453 B2 | * | 8/2003 | Morgan et al. | 315/312 |
| 6,681,154 B2 | | 1/2004 | Nierlich et al. | |
| 6,771,029 B2 | * | 8/2004 | Ribarich et al. | 315/292 |
| 6,792,323 B2 | * | 9/2004 | Krzyzanowski et al. | 700/90 |
| 6,836,080 B2 | * | 12/2004 | Kazanov et al. | 315/294 |
| 6,885,309 B1 | | 4/2005 | Van Heteren | |
| 6,892,168 B2 | | 5/2005 | Williams et al. | |
| 6,990,394 B2 | | 1/2006 | Pasternak | |
| 2005/0023996 A1 | | 2/2005 | Adamson et al. | |
| 2005/0184671 A1 | | 8/2005 | Williams et al. | |

* cited by examiner

*Primary Examiner*—Leo Picard
*Assistant Examiner*—Sheela S. Rao
(74) *Attorney, Agent, or Firm*—McKenna Long & Aldridge LLP

(57) ABSTRACT

A lighting control system for managing utility operation parameters, including a ballast control module configured to communicate with a lighting ballast; a data processing module connected to the at least one ballast control module via a wireless communications link; and a wireless internet control center wirelessly connected to the ballast control module via the data processing module and arranged to operate a plurality of utility operation applications. The lighting control system may further include a plurality of repeaters connected to the data processing module. The communications link between the data processing module and the ballast control module is one of a local area network and a wide area network.

25 Claims, 17 Drawing Sheets

| WEEKDAY | WEEKEND |
|---|---|
| SET TIME<br>[SUNRISE]<br>SET LEVEL<br>[FULL BRIGHT] | SET TIME<br>[08:00 AM]<br>SET LEVEL<br>[FULL BRIGHT] |
| SET TIME<br>[08:00 AM]<br>SET LEVEL<br>[75% BRIGHT] | SET TIME<br>[12:00 PM]<br>SET LEVEL<br>[75% BRIGHT] |
| SET TIME<br>[05:00 PM]<br>SET LEVEL<br>[50% BRIGHT] | SET TIME<br>[05:30 PM]<br>SET LEVEL<br>[50% BRIGHT] |
| SET TIME<br>[10:00 PM]<br>SET LEVEL<br>[25% BRIGHT] | SET TIME<br>[11:00 PM]<br>SET LEVEL<br>[25% BRIGHT] |

FIG. 14C

WIRELESS INTERNET LIGHTING CONTROL SYSTEM

BACKGROUND OF THE INVENTION

1. Field of the Invention

The present invention relates to control systems. More particularly, the present invention relates to wireless lighting control systems that utilize both local area networks (LAN) and wide area networks (WAN) to control lighting fixtures via the internet.

2. Discussion of the Related Art

Various lighting control systems are known that offer fully automatic and energy efficient lighting control or switching that include settings that are preset by a user to activate all or a portion of lights upon detecting occupants within a room. The lighting control systems may also adjust the illumination level at a particular location while saving power. Additionally, there exists an internet-based home communications system that permits a homeowner to monitor and control various features of their home from a distant location using a plurality of control devices that are positioned within the home and connected to a control unit in communication with a global computer network. The homeowner can view, monitor and control features of their home, such as adjusting the thermostat for the interior of the home or turning a light on/off, through a web page.

However, these lighting control systems fail to provide lighting control having automated operation, statistical analysis and diagnostic capabilities which function to manage utility loads and diagnose various utility operation parameters such as dimming level, intensity level and visual light ambience based on a combination of environmental energy conditions (i.e., energy pricing) as well as predetermined user-defined schedules.

SUMMARY OF THE INVENTION

Accordingly, the present invention is directed to a wireless internet lighting control system that substantially obviates one or more of the problems due to limitations and disadvantages of the related art.

An advantage of the present invention is to provide a lighting control system that automatically operates to control light intensity (dimming), automated run options, and/or scheduling, and can be implemented and administered via automation through a standard web browser.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a lighting control system for managing utility operation parameters, comprises: at least one ballast control module configured to communicate with at least one lighting ballast; a data processing module connected to the at least one ballast control module via a wireless communications link; a wireless internet control center wirelessly connected to the ballast control module via the data processing module and arranged to operate a plurality of applications; and a plurality of repeaters connected to the data processing module, wherein the communications link between the data processing module and the at least one ballast control module is one of a local area network and a wide area network.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 14C illustrates a lighting schedule in accordance with an embodiment of the present application.

DETAILED DESCRIPTION OF THE ILLUSTRATED EMBODIMENTS

Reference will now be made in detail to an embodiment of the present invention, example of which is illustrated in the accompanying drawings.

Figure 1:
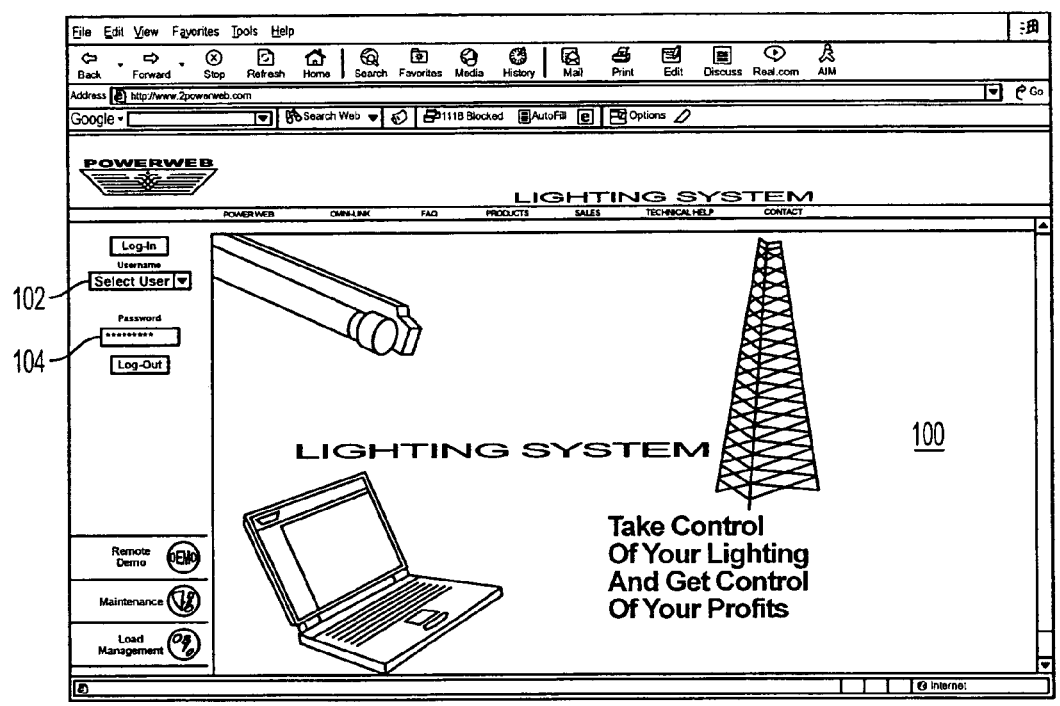
FIG. 1 is an initial screen shot of a log-in page for a wireless internet lighting control system in accordance with an embodiment of the present application.

FIG. 1 illustrates an initial screen shot 100 of a log-in page for a wireless internet lighting control system in accordance with an embodiment of the present application. As illustrated in FIG. 1, a user is prompted to log-in/out of the wireless internet lighting control system by entering a user name 102 and password 104. The user name 102 may be one of a Facilitator, User and Administrator. An example of a Facilitator is a local building manager; while an example of an Administrator is an off-site building manager, for instance in another region. A User is an individual user of the system. Once the user name 102 is entered, a pre-determined password 104 is entered to complete the log-in to the system.

Based upon the user name 102, various administration options are available. For example, the Facilitator may be prompted to set-up lighting for a single building or local control zone set-up, and an Administrator may be prompted to set up lighting for multiple buildings.

Figure 2:
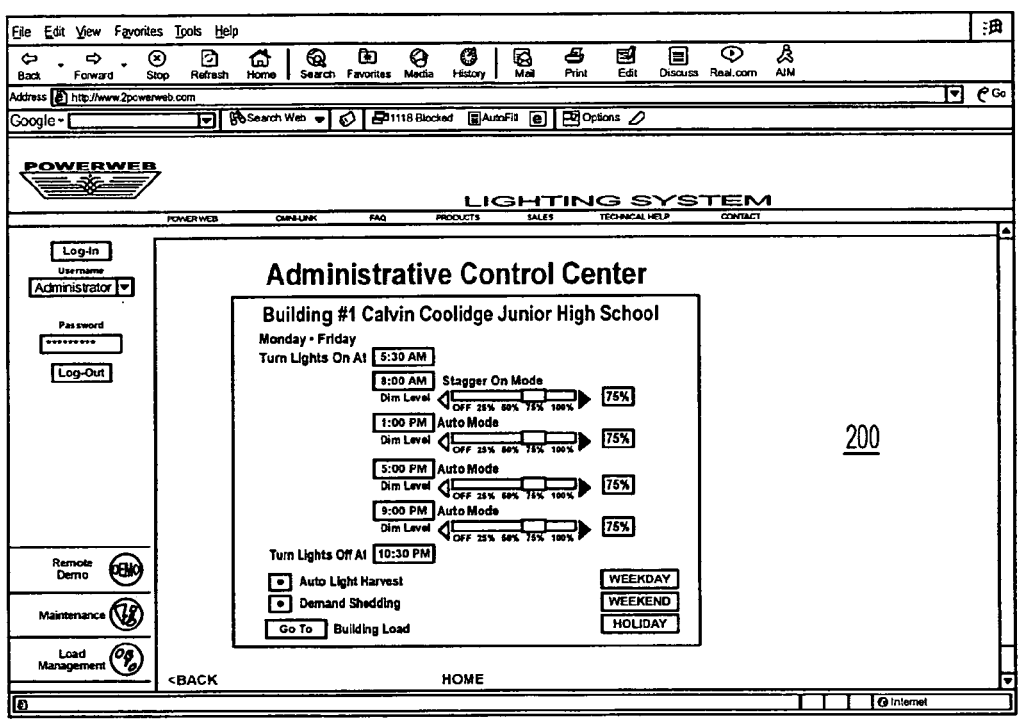
FIG. 2 is a screen shot of an Administrative Control Center of a wireless internet lighting control system in accordance with an embodiment of the present application.

FIG. 2 illustrates a screen shot 200 of an Administrative Control Center of a wireless internet lighting control system in accordance with an embodiment of the present invention. In FIG. 2, the control center allows a user (Facilitator or Administrator) to control the lighting schedule within a building or a group of buildings. For example, the control center includes, but may not be limited to, options for light operation during weekends, weekdays and holidays, dimming levels of lights, and the number of lights on for a selected period of time.

Figure 3:
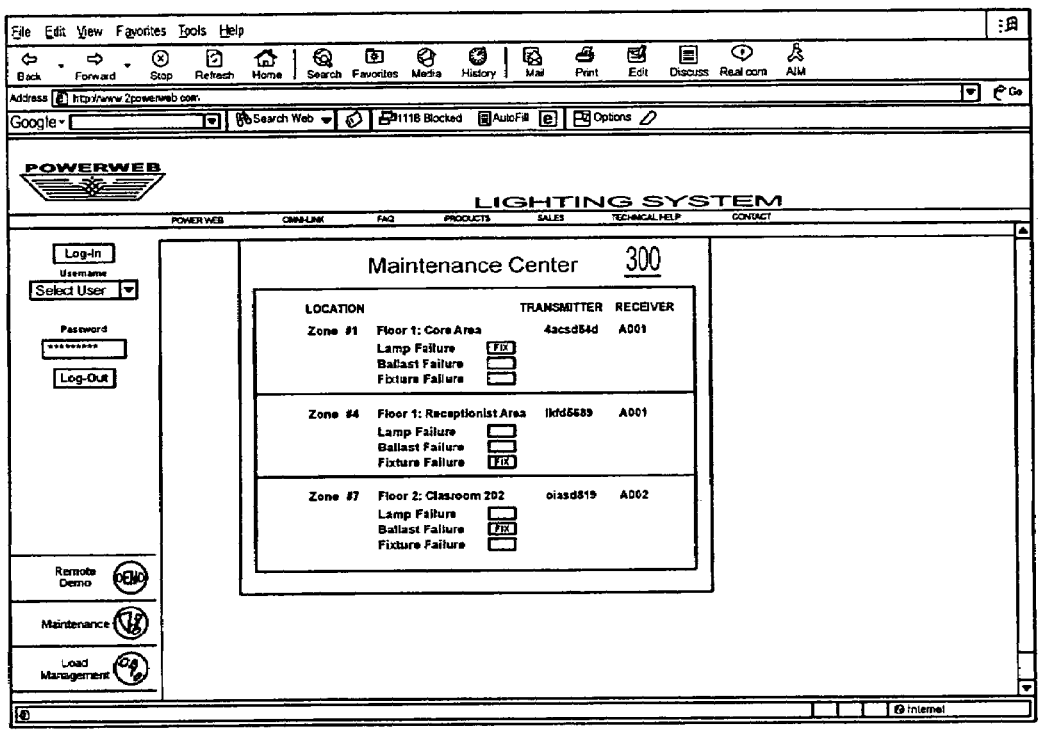
FIG. 3 is a screen shot of a Maintenance Center of a wireless internet lighting control system in accordance with an embodiment of the present invention.

FIG. 3 illustrates a screen shot 300 of a Maintenance Center of a wireless internet lighting control system in accordance with an embodiment of the present invention. In FIG. 3, a Maintenance Center functions to provide immediate reports and notifications when a lamp or ballast has failed on the system. For example, in the maintenance center, the Facilitator and/or Administrator may receive a report, an instant email or posting to a message board which would provide a link to the Maintenance Center on the website. The message notification may also be sent directly to a repair or local maintenance crew to complete the repair. Information provided on the Maintenance Center screen shot may include the location, zone and serial number of the troubled lighting fixtures on the network.

Figure 4:
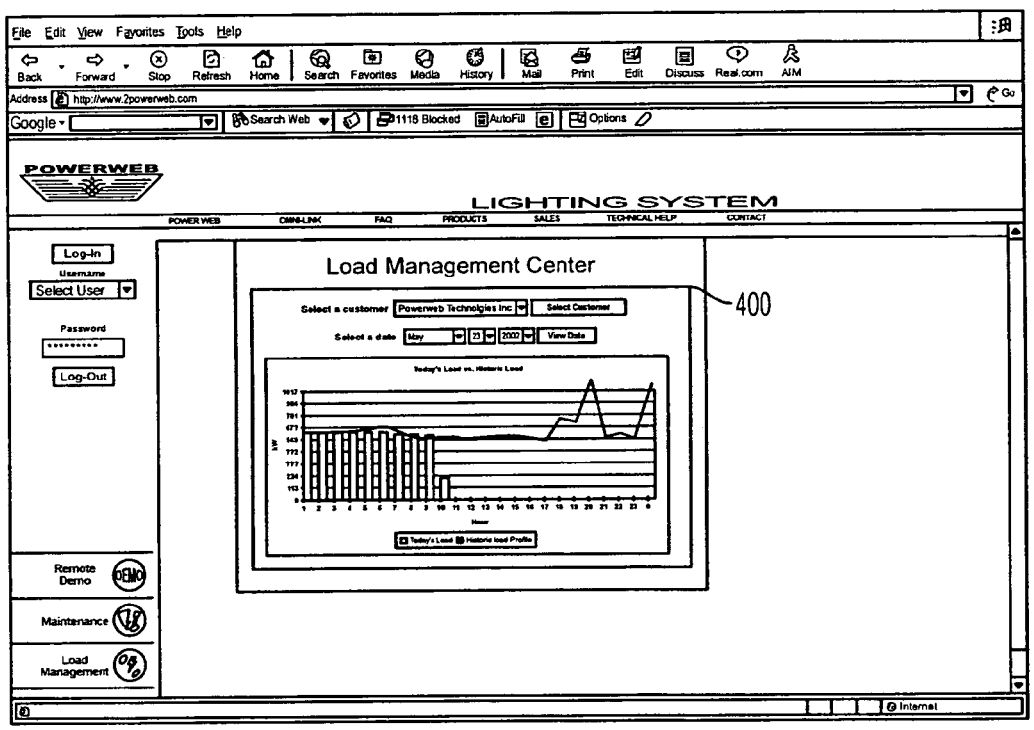
FIG. 4 is a screen shot of the Load Management Center of the wireless internet lighting control system in accordance with an embodiment of the present invention.

FIG. 4 illustrates a screen shot 400 of the Load Management Center of the wireless internet lighting control system in accordance with an embodiment of the present invention. In the Load Management Center, notification is provided to the Facilitator and/or the Administrator when there is an opportunity to curtail a utility load in real time, for example when there is a load demand threshold as described in U.S. Pat. No. 6,311,105 and U.S. Pat. No. 6,122,603 which are hereby incorporated by reference. For example, the utility load may include electricity, steam, gas and other consumable fuels and utility materials. A user may also monitor, via the Load Management Center, demand response events for load control in order to sell excess utility capacity and energy into the market when conditions are most favorable.

Figure 5:
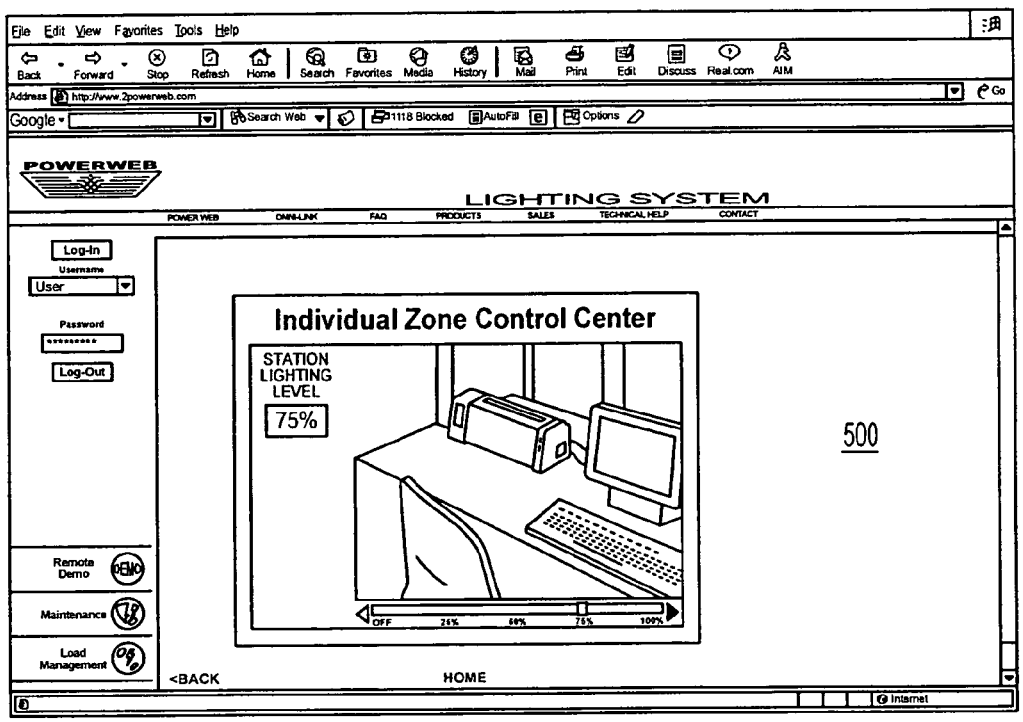
FIG. 5 is a screen shot of an Individual Zone Control Center in accordance with an embodiment of the wireless internet lighting control system of the present invention.

FIG. 5 illustrates a screen shot 500 of an Individual Zone Control Center of the wireless internet lighting control system in accordance with an embodiment of the present invention. In FIG. 5, an individual User may control the lighting level of a particular fixture f or a particular zone associated with the lighting system.

Figure 6:
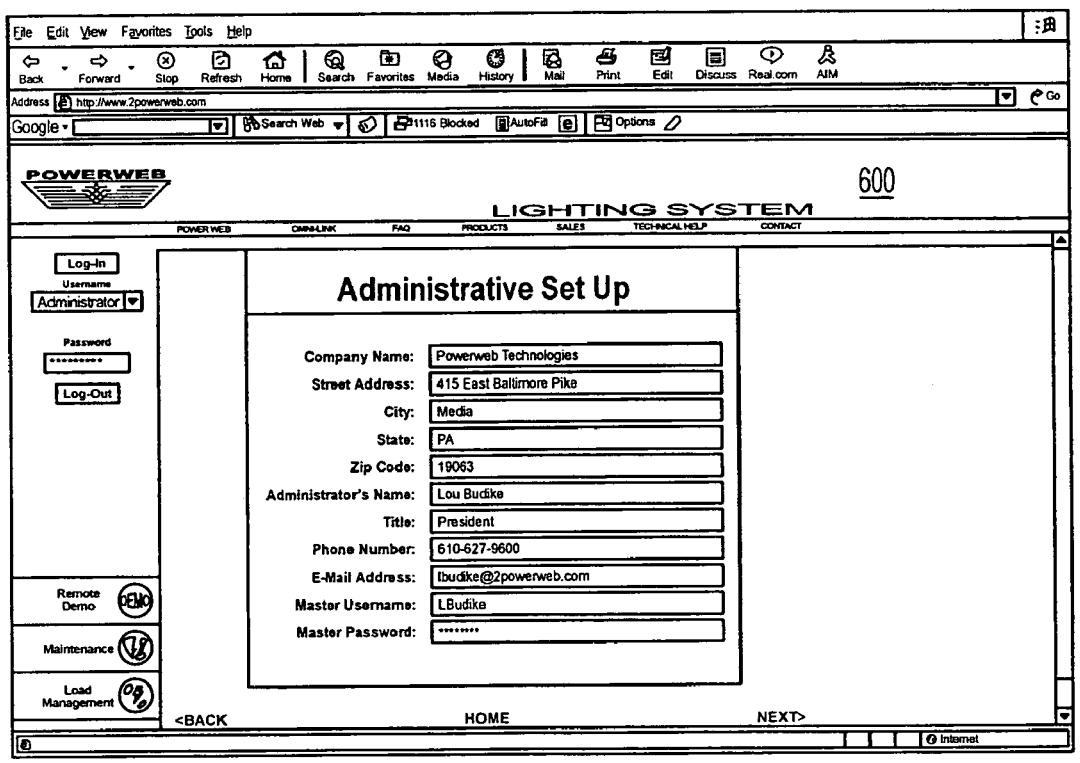
FIG. 6 is a screen shot of an embodiment of the present invention in which the Facilitator and/or Administrator are presented with an option to set up a single facility on the wireless internet lighting control system.

FIG. 6 illustrates a screen shot 600 of an Administrative set-up screen in accordance with an embodiment of the present invention through which the Facilitator and/or Administrator can set up a single facility on the wireless internet lighting control system. In FIG. 6, the user enters administrative information and lighting identification information for the client which are stored in a database associated with the system, analyzed, and retrieved during a diagnostic system check.

Figure 7:
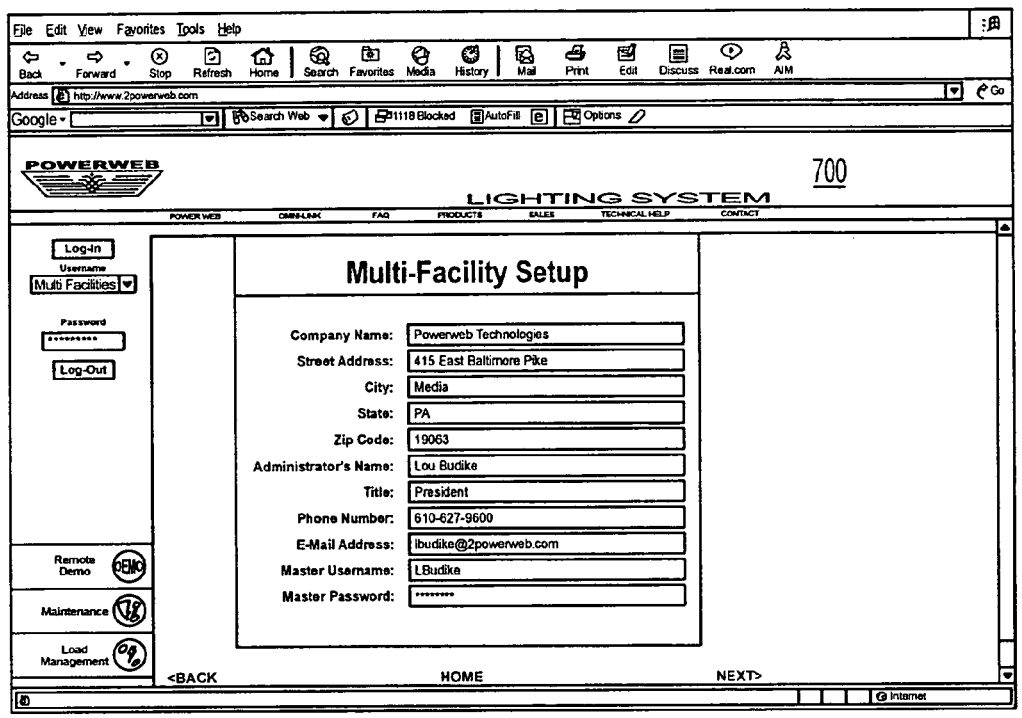
FIG. 7 is a screen shot of an embodiment of the present application in which the Administrator is presented with the option to set up or modify multiple groups of buildings.

FIG. 7 illustrates a screen shot 700 of a multi-facility set up screen in accordance with an embodiment of the present invention through which the Administrator can set up or modify multiple groups of buildings and facilities on the system. In FIG. 7, the Administrator may control groups of fixtures in different regions or time zones around the country on multiple schedules.

Figure 8:
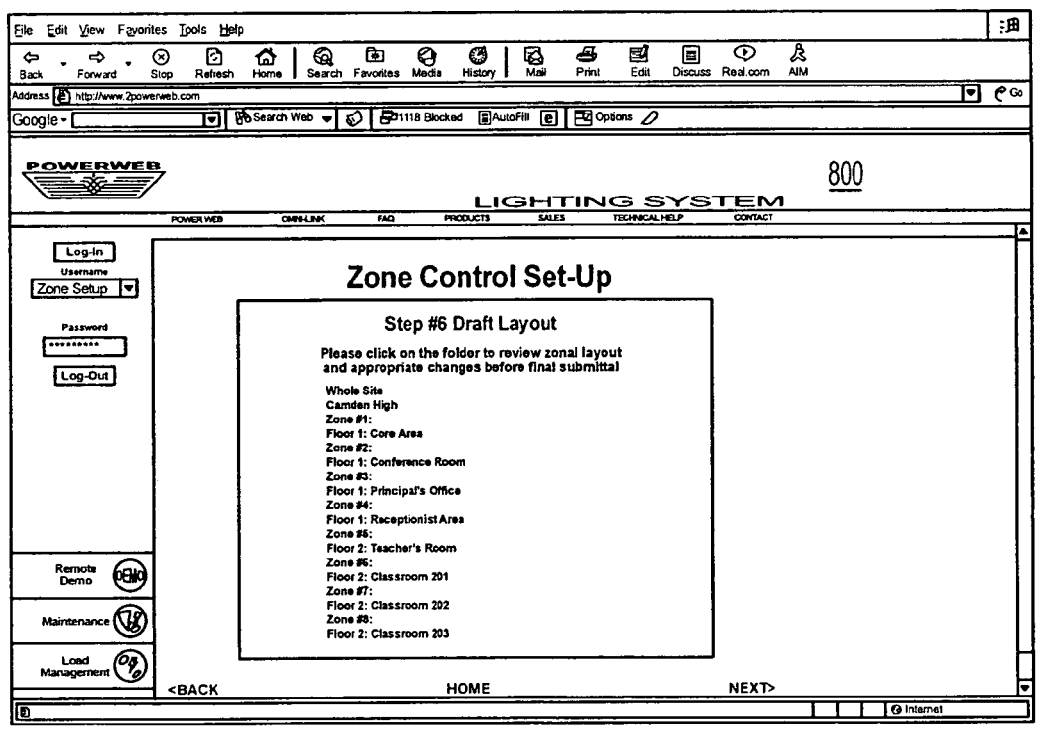
FIG. 8 is a screen shot of an embodiment of the present invention in which users set up distinct zone control features.

FIG. 8 illustrates a screen shot 800 of a Zone Control set-up screen in accordance with an embodiment of the present invention through which a user may can define each control zone on the system, where a building may be divided into many individual zones and/or groups of fixtures that can be controlled by a zone or zone group throughout the network of buildings on the system.

Each of the above screen shots illustrated in FIGS. 1–8 are part of the wireless internet lighting control system of the present application. There are two primary types of fixtures and fixture ballasts that may be controlled by the wireless internet lighting control system of the present invention: fluorescent ballasts and High Intensity Discharge (HID) ballasts. The fluorescent lamps driven by magnetic and electronic ballasts are typically compact fluorescent lamps, T-12 fluorescent lamps, T-8 fluorescent lamps, T-5 fluorescent lamps, T-4 through T-1 fluorescent lamps, and all other bi-ax driven fluorescent lamps. The HID fixtures are typically driven by both magnetic and electronic ballasts which drive metal halide (MH) and high-pressure sodium (HPS) discharge lamps. The system is also designed to configure and control light emitting diode (LED) lighting as well as chemical based illumination lighting products.

Figure 9:
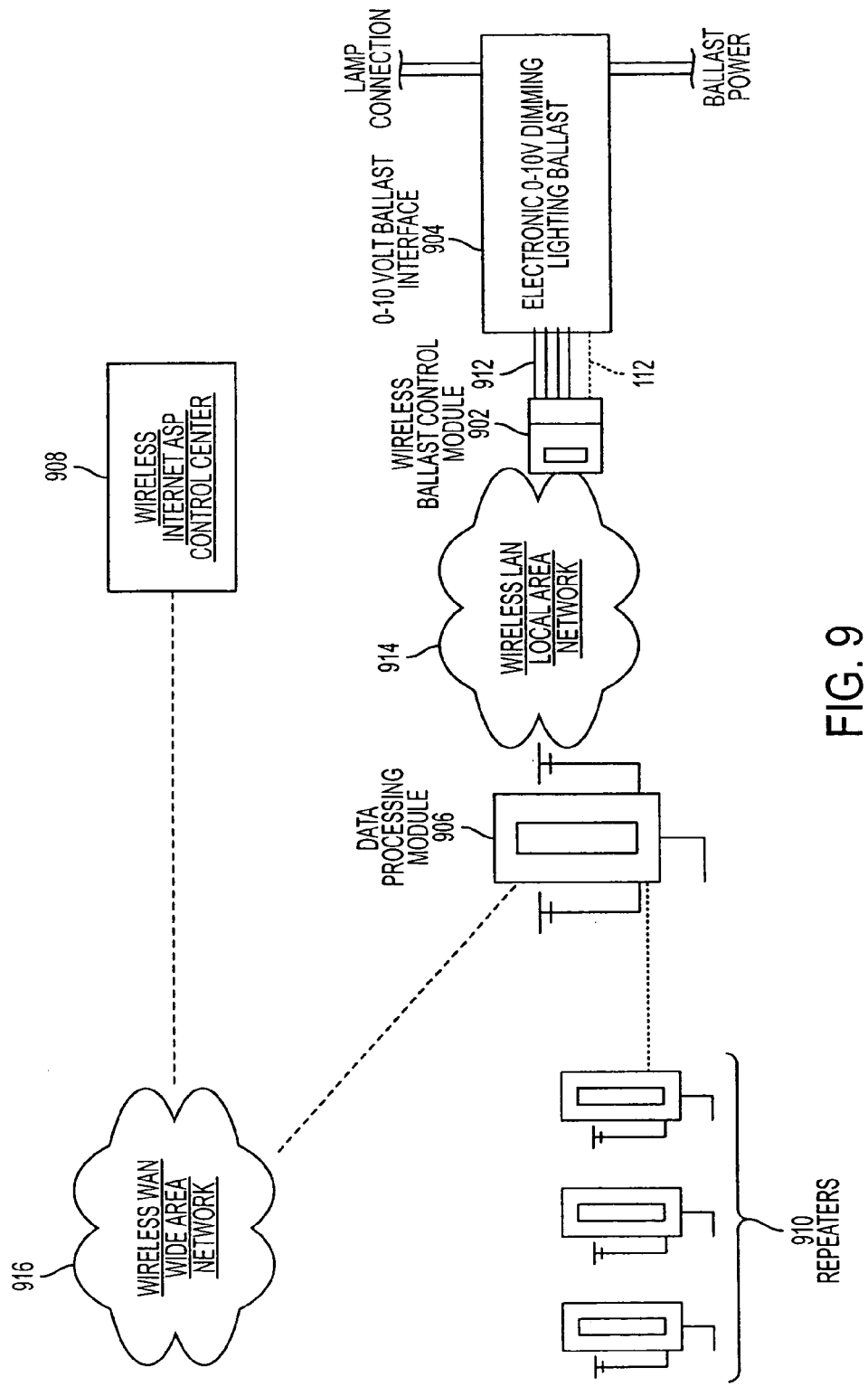
FIG. 9 is a wireless internet lighting control system in accordance with an embodiment of the present invention.

FIG. 9 illustrates a wireless internet lighting control system (WILCS) in accordance with an embodiment of the present invention. In FIG. 9, the WILCS includes a module 906, a wireless internet active service provider (ASP) control center 908, and a plurality of repeaters 910.

The ballasts in the wireless internet lighting control system of the present application may be interfaced to the WBCM in many configurations including: a low voltage (e.g., 0 to 10 volt) interface; a power line carrier interface; a digital addressable lighting interface (DALI) to control the ballast based on power level as well as provide extensive system feedback; and a hybrid interface which would be any combination of the low voltage, power line carrier or DALI interfaces. With multiple low voltage interfaces, the ballast will respond to different levels of power based on the voltage or signal received by the ballast. For example, 0 volts may be fully "off", 5 volts may be 50% power (50% dimming), and 10 volts may be fully "on".

The wireless ballast control module (WBCM) 902 is the main interface to the lighting ballast 904 via link 912. The WBCM 902 connects and permits communication between the data processing module 906 via communications link 914, for example a wireless local area network (LAN) or wide area network (WAN) connection.

Figure 10A:
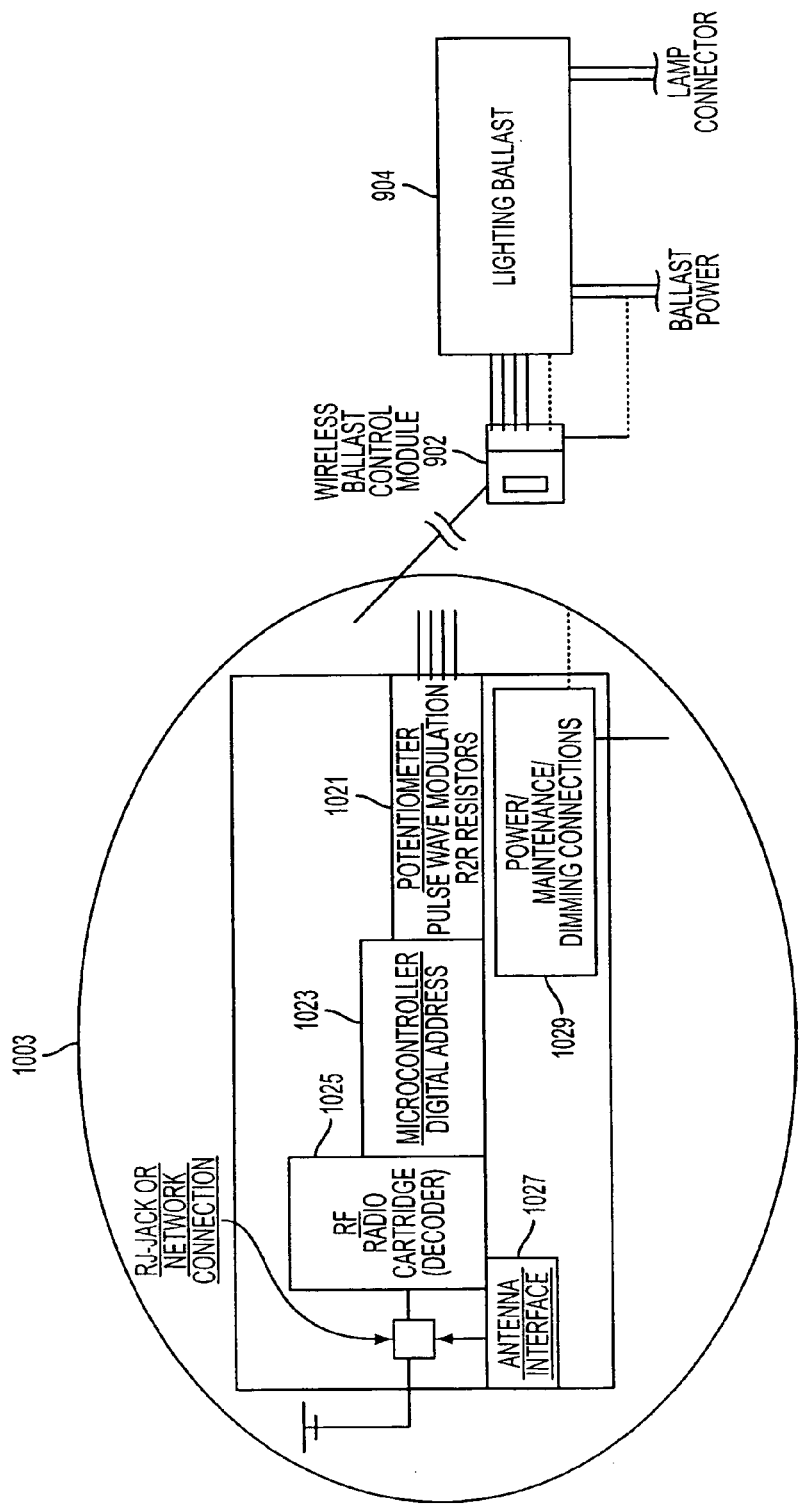
FIGS. 10A and 10B illustrate a wireless ballast control module in accordance with an embodiment of the present application.

FIG. 10A illustrates an expanded view 1003 of a wireless ballast control module 902 in accordance with an embodiment of the present invention. The expanded view 1003 includes: a potentiometer 1021 that produces signals, voltages and resistance needed for the ballast to respond. The signals, voltages, and resistances can be produced by multiple means including pulse wave modulation or a series of R2R resistors. The wireless ballast control module also includes a microcontroller 1023 that is adapted to hold the memory and logic of the wireless ballast control module. The microcontroller 1023 creates a unique digital address on the wireless Local Area Network (LAN) as well as performs all the data processing of commands that are being received by lighting ballast 904 or a RF decoder cartridge 1025.

The RF radio decoder cartridge 1025 is a wireless transceiver device that is adapted to connect portions of the wireless ballast control module to the wireless LAN network. The RF radio cartridge decodes proprietary protocols, such as security codes, and transmits and receives control and diagnostic information to the wireless ballast control module 902. The RF radio decoder cartridge 1025 transmits at multiple frequencies and multiple data rates. For example, the range may be from 433 MHz at 14.4 Kbs to 802.11 MHz at 5 Mbs. The antenna interface 1027 may be a shielded cable that plugs into the WBCM to allow multiple reception configurations including half wave, full wave and standard radio. The expanded view 1003 further includes an antenna interface 1027. The antenna interface 1027 and the radio decoder cartridge 1025 are connected via a RJ-jack or network connection.

Figure 10B:
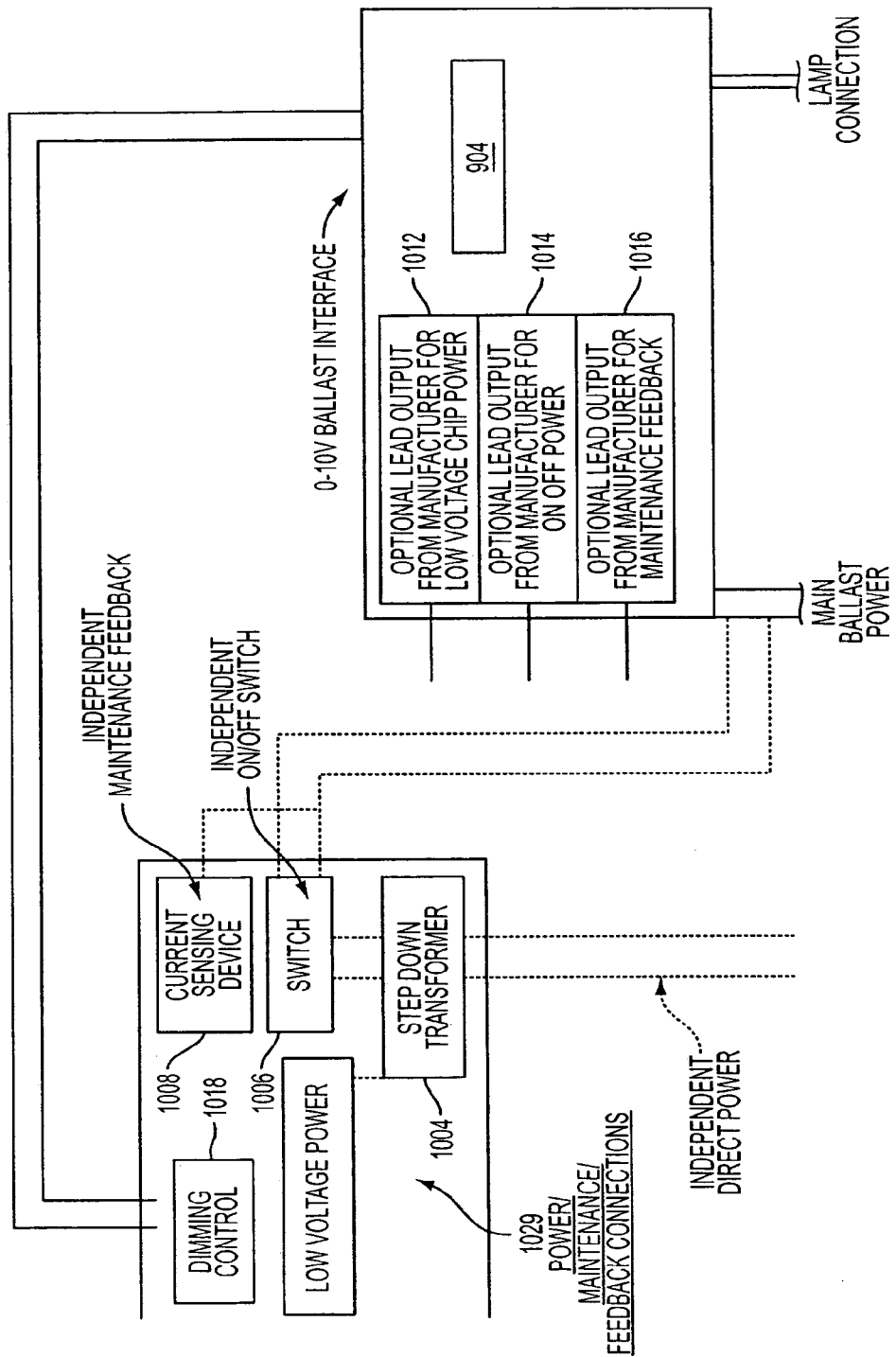

The wireless ballast control module 902 may interface with the lighting ballast 904 in various ways. As shown in FIG. 10B, if the wireless ballast control module 902 is not integrated directly into the ballast, then the wireless ballast control module 902 will have an independent power source different from the ballast 904. The independent power source may be a standard 120/277 volt power supply in the United States, but may also facilitate step-up or step-down power transformation to accommodate 347 volts in Canada and a wide range of voltages in Asian and European countries. The power from the independent power supply is distributed in two directions. After entering a step-down transformer 1004, low voltage power is distributed in a first direction to power the internal components of the wireless ballast control module 902. The internal components may operate on a variety of low voltage sources; however, 24 VAC is the base standard. The high voltage power from the step-down transformer 1004 is connected to a switch 1006. The switch can be designed as a solid state switch or may be configured with an electronic triac to perform line switching. If an optional lead output 1014 exists from the ballast 904, then switch 1006 is not needed to power the ballast 904 ON/OFF. The output power from the switch 1006 is used to connect to the lighting ballast 904. The low voltage power from the independent source or provided from the ballast is used to power the current sensing device 1008. If an optional lead output 1016 to provide maintenance feedback exists in the lighting ballast 904, then the current sensing device 1008 may not be necessary. In the configuration in which an independent power source is used, the wireless ballast control module 902 can independently control the ON/OFF power to the lighting ballast 904. However, if an optional lead output 1012 is provided to supply a low voltage power to the wireless control module 902, then the step-down transformer 1004 is not needed.

The wireless ballast control module 902 may further include a dimming control 1018 to directly control dimming of the ballast 904 through a standard 0–10 volt output or via micro-controlled driven functions. The circuit board design of the WBCM will allow for high frequency switching and control to the solid state switch or electronic triac 1006. The high frequency switching and control will allow for dimming of a standard non-dimming ballast. Analog or digital controlled dimming may be available through the dimming control 1018 using an n-bit microcontroller, for example, an 8-bit microcontroller that would provide a 256 step dimming process for smooth dimming transitions. In particular, 256 steps of dimming may be integrated into the design of the dimming control features. The dimming control 1018 may also be facilitated via a custom dimming configuration that does not operate from an internal 0–10 volt processor. Specifically, there may be an alternative means to provide the dimming control through an X-10 based power line carrier transmission, wire line side dimming (i.e., a two-wire system) and supplied by the ballast manufacturer.

The wireless ballast control module 902 may provide maintenance feedback to indicate, for example, a ballast and/or lamp failure within the wireless internet lighting control system. In order to provide feedback, the current sensing device 1008 is arranged in line with the main power source to the ballast in order to poll the wattage to determine whether there is a power drop indicating a device failure in the system. If a failure is determined, then an alert may be sent to indicate the location of the failure. In the case of the ballast 904 supplying power to the wireless ballast control module 902, the ballast manufacturer may include an independent maintenance configuration showing voltages across certain ballast components to determine if a lamp or ballast device has failed on the system.

Figure 11A:
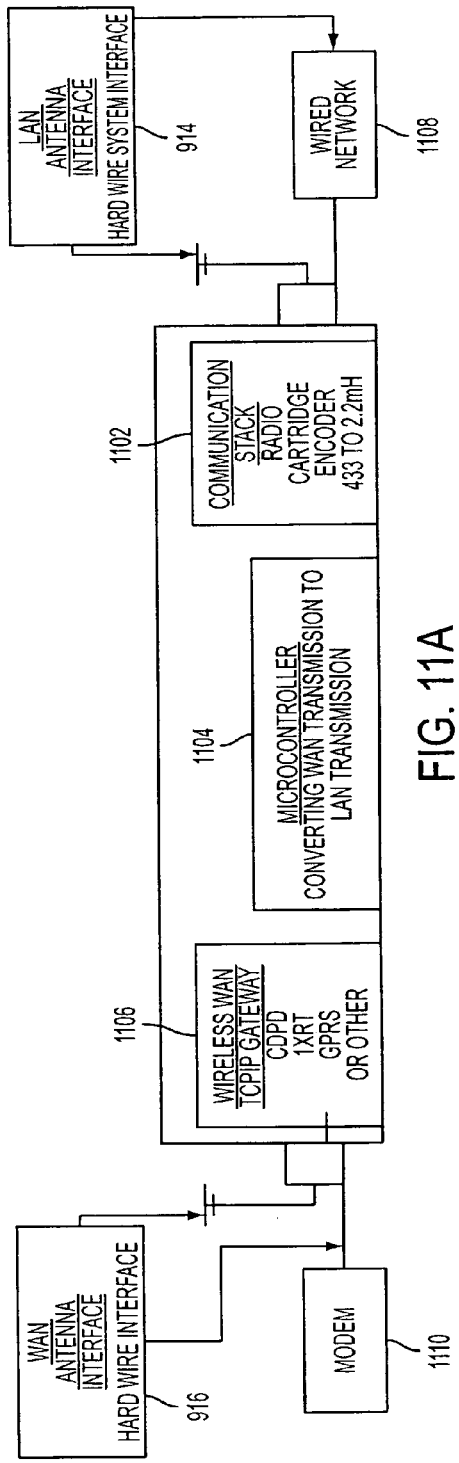
FIGS. 11A and 11B illustrate a wireless data processing module in accordance with an embodiment of the present application.
Figure 11B:
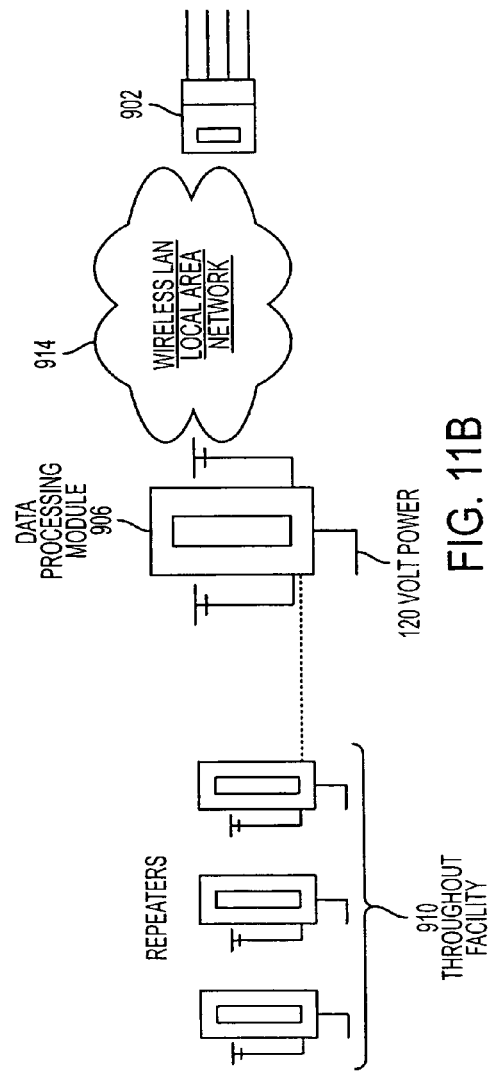

FIG. 11A is an expanded view of a wireless data processing (WDP) module 906 in accordance with an embodiment of the present invention. FIG. 11B depicts the WDP 906 in relation to the other components of the wireless internet lighting control system of the present application. The WDP 906 is a transceiver that acts as the wireless gateway to the internet active service provider control center 908 to wirelessly connect the WBCM 902 through the WDP module 906 and interface to the internet ASP control center 908. The WDP 906 includes three sections that perform various functions.

In the wireless data processing module 906 illustrated in FIG. 11A, a local communication cartridge encoder 1102 provides security and proprietary protocol, data transfer and diagnostic information such that the wireless transmissions are encoded at the WDP module and decoded at the WBCM by the radio decoder cartridge 1025. The transmissions may be a wired or wireless (e.g., infrared) scheme. As illustrated in FIG. 11A, the radio cartridge encoder 1102 is a wireless transceiver device that may connect other devices to the WBCM via a hard wired network 1108 or via a wireless local area network 914. The radio cartridge encoder 1102 may transmit at multiple frequencies at both fast and slow data transfer rates. For example, the multiple frequency range can be from 433 MHz at 14.4 Kbs to 802.11 MHz at 5 Mbs. In addition to wireless communications, the system may also be configured to interface into select hardwire mediums. Hard wired solutions could be one or two addressable low voltage connections that are directly hardwired into the microcontroller 1104, as well as X-10 power line communications. In addition, communication and integration can also be achieved through infrared wireless technologies or radio technology.

A microcontroller 1104 contains the memory and logic of the WDP module 906. The microcontroller 1104 bridges the two wireless networks, LAN 914 and WAN 916, and converts the proprietary protocols and data "wrapper" from the WAN 916 to the LAN 914. Further, the microcontroller 1104 controls the traffic flow, the system logic and the memory required to operate the entire wireless internet lighting control system locally, for example via an intranet or local computer, in the event of a disconnection from the ASP control center 908 or power loss.

The microcontroller 1104 may include two main processor components that may be added in order to facilitate "total" local control or "limited" local control. With "total" local control, there is a hard embedded operating system, for example a Linux Operating System, which has the processing power to drive direct software applications that are microprocessor-based. The hard embedded operating system would permit a full set of application software, similar to the HTML-based GUI software, to be operated locally and interfaced through to the WDP module 906 via a LAN connection. The software application GUI would be provided and installed on the local computer in order to process and control commands. The "total" local control configuration provides full control without the need of a wide area network and a HTML based GUI because control of the system would be facilitated from the local networked computers instead of the internet GUI.

With the "limited" local control configuration, the microcontroller has an embedded RAM memory chip that can operate specific scheduling functions without the need of the master GUI from the internet. For example, if communication to the main network is lost, the local data processing unit would be able to perform standard schedules and operations without using the internet ASP control center 908.

The wireless WAN TCPIP gateway 1106 connects the WDP module 906 to the ASP control center 908. The wireless WAN TCPIP gateway 1106 may use a variety of wireless communication means, for example, 3G wireless such as 1XRT, CDPD package data (analog), Reflex Paging Technology, and GPRS communication means. The system may also work from standard telephone lines that are controlled through a bank of modems 1110 that connect to a hard wired system.

A static TCPIP session may be set up between the wireless WAN gateway 1106 and a network operation center 1341 (FIG. 13) which is a server located on the ASP control center 908. Once the static TCPIP session is locked into a static IP address, various information, such as security, protocol translation, data transfer, diagnostic reports, schedules and two-way control may occur between the WDP module 906 and the ASP control center 908.

Figure 12:
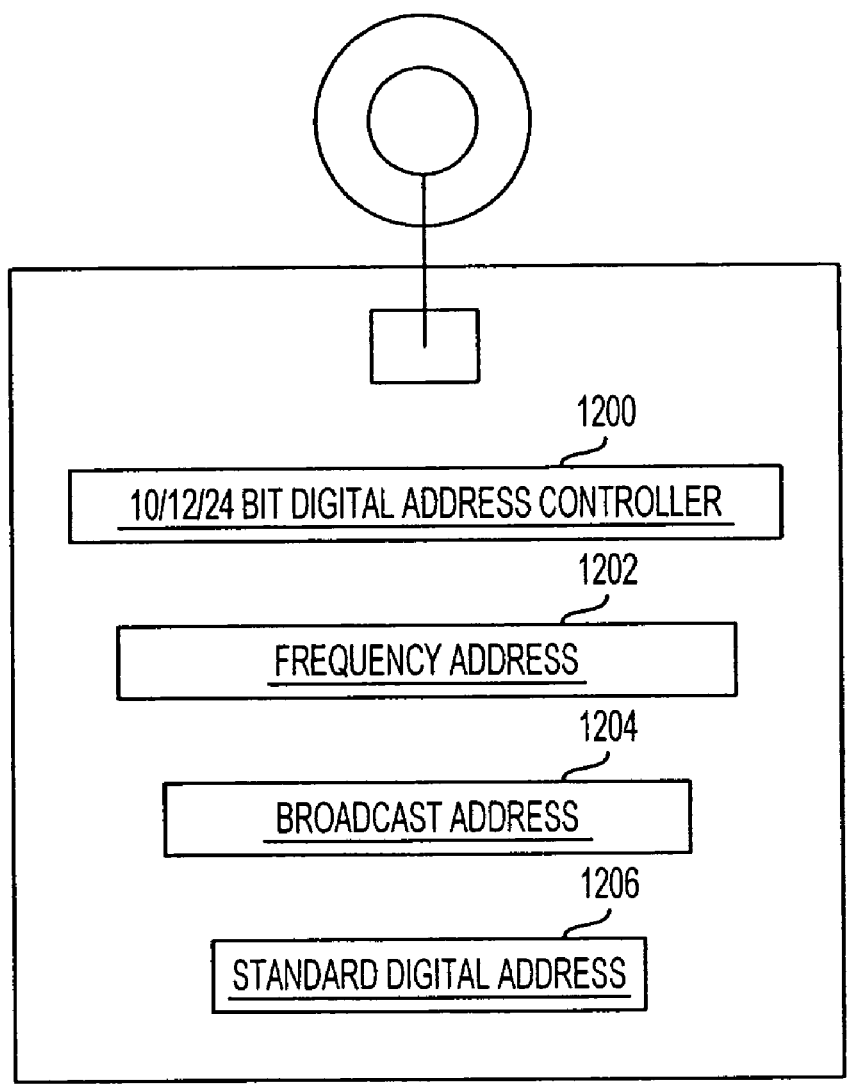
FIG. 12 illustrates digital address control and hierarchy in accordance with an embodiment of the present invention.

The WDP module 906 includes various features. For example, the WDP module 906 may include digital address control. As illustrated in FIG. 12, the digital address control 1200 may include, for example, three levels of control to prevent potential interference problems from occurring. The three levels of FIG. 12 include frequency address 1202, broadcast address 1204, and digital standard address 1206.

A sophisticated digital address controller 1200 and hierarchy provide control and direct information to and from the digital addresses of the ballast control modules in the system. With regard to the frequency address configuration 1202, to alleviate overlay of signals from other systems and to prohibit a potential zone command being controlled by a neighboring system, three distinct frequency ranges are provided to enable the system to be coded into three separate systems having identical infrastructures, however, operating on different frequencies. In the case of another system operating close by, the address configuration would be configured in its entirety to a different frequency to alleviate signals associated with one system from controlling the address from another system. The design of the communication system works in concert with the repeaters 910. The digital address system architecture performs an automated polling sequence through the repeaters 910 in order to have all the addresses in the network identify their local address, broadcast address, and frequency. This polling sequence permits the system to poll through all the addresses that were sent information from the data processing module 906. The polling sequence further narrows the scope of the address throughout a building and thus, reduces the possibility of errors, wireless null sets, and misread data addresses by identifying in advance and polling only the points that were originally transmitted.

For the broadcast address configuration 1204, the broadcast addresses divide the standard 8-bit microcontroller and set aside a certain amount of the address to become the broadcast address. This broadcast address will become a "master" broadcast to control each of the fixtures instantly from one main command given by the system. The broadcast digital address may be used to override local digital address commands and also have the ability to control the entire system instantly.

For the standard digital address 1206 configuration, based upon the instantaneous zone control and maintenance feedback systems of the present invention, the standard digital address divide the standard 8-bit microcontroller and set aside a certain amount of the address to become the standard address on the system. This standard address serves as the main address of the ballast control module and can provide a location of the fixture throughout the network.

Figure 13:
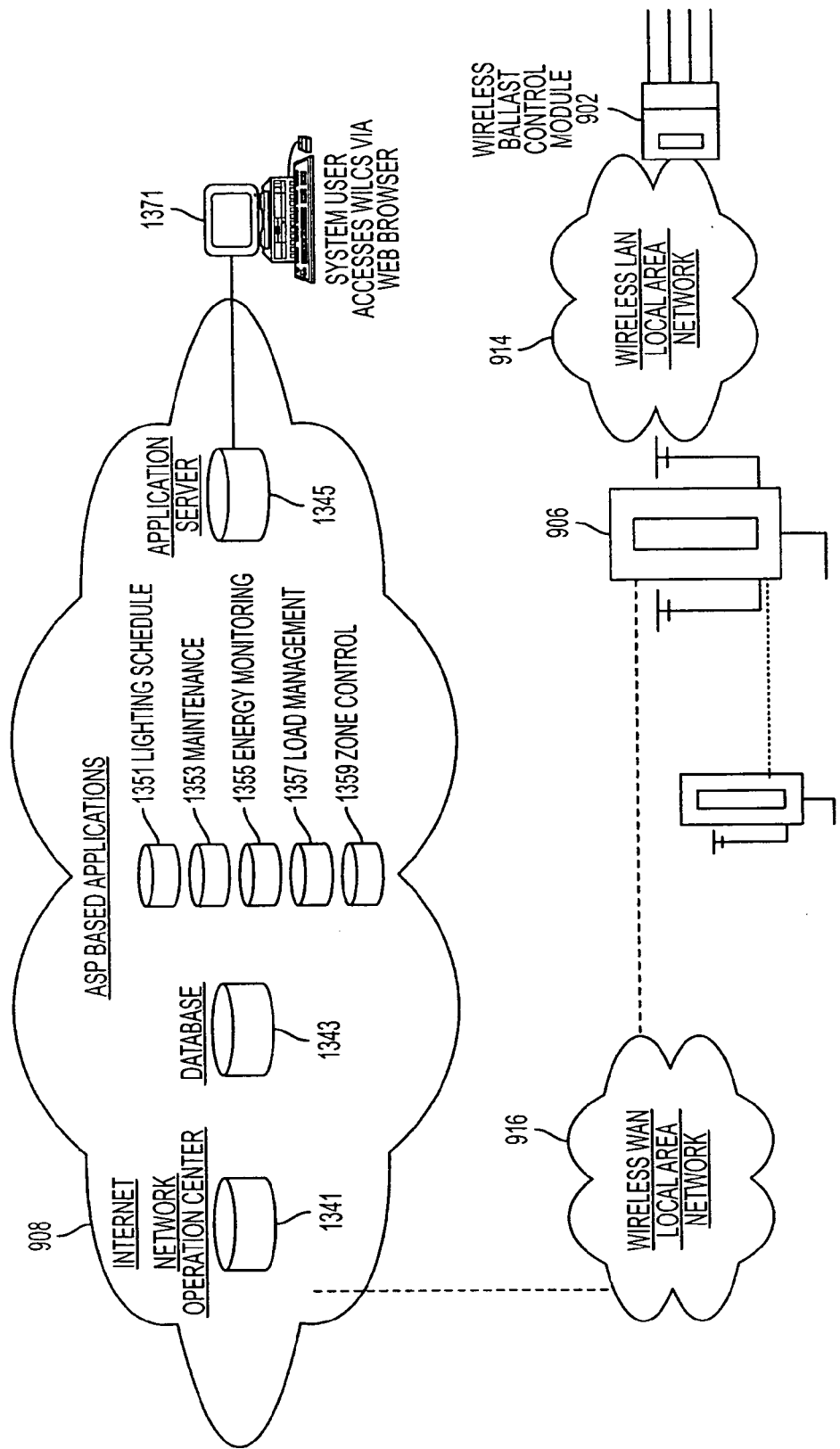
FIG. 13 illustrates a wireless internet application service provider control center in accordance with an embodiment of the present invention.

FIG. 13 illustrates the wireless internet ASP control center 908 in accordance with an embodiment of the present application. The wireless internet ASP control center 908 acts as the brain of the wireless internet lighting control system (WILCS) of FIG. 9. The wireless internet ASP control center is a server that operates individual ASP-based applications to facilitate various functions for the WILCS 900. The wireless ASP control center 908 includes three main sections: a network operation center 1341, a database server 1343, and an application server 1345.

The network operation center 1341 of the wireless internet ASP control center 908 is the server that connects the wireless carrier and bridges the wireless internet ASP control center 908 to the WDP module 906, directly or via repeaters 910, for communication between the two devices.

The database server 1343 of the wireless internet ASP control center 908 is the computer server that manages the WILCS 900 information such as particular building information, various system settings and data storage, lighting zone control information, user names, passwords, and other critical information, etc.

The application server 1345 of the wireless internet ASP control center 908 is computer server that contains the actual applications that operate the functionality of the WILCS 900. The application server 1345 further controls the screens of the screen shots depicted in FIGS. 1–8. There may be one or more applications that are available from the application server 1345 for the lighting system. For example, there may be a light scheduling application 1351, zone control 1359 for grouping of timed automatic or remote manual on/off control, energy monitoring 1355, load management 1357, maintenance 1353, and miscellaneous other dimming features.

With regard to the light scheduling application 1351, the WILCS 900 has the intelligence to calculate the amount that is being saved by a customer through, for example, light dimming. Once the internet ASP control center dims the lights, the WILCS 900 can calculate the savings attributable to the dimming and translate the savings to actual dollars saved by the customer. The actual dollars saved may be calculated on a month-to-month basis and generated in a report to demonstrate the continued savings of the WILCS 900.

A sub-feature of the light scheduling application 1351 may include a lighting ramp-start process. Facilities typically do not have a system that ramps the lighting on at the beginning of each day in the way that mechanical systems may be operated. For example, a mechanical system may be programmed to pre-cool a building on a hot day or delay light operation until the building is fully occupied. However, with lighting, the lights are usually turned on as soon as the first person walks in the building. When operating a building on this premise, the entire building is lit approximately 3–4 hours before the building reaches 80% occupancy. In addition to the 3–4 hours in the beginning of the day, most commercial facilities only reach 80% occupancy during the day with employee vacations, travel, and general business activities. Thus, there are areas of the building that are not occupied and which remain lit during the entire day. Lighting ramp-start is a technique provided by an embodiment of the present application in which the lights are ramped up in the morning. That is, the lights are gradually activated with respect to brightness and/or location. The wireless internet lighting control system will systematically turn on all the lighting in the building at the appropriate time and level. Further, the wireless internet lighting control system has the intelligence to calculate the savings attributable to ramping the lights, and the savings associated with keeping the lights off throughout the building in areas in which there is no need for lighting. The amount of money saved using the ramp-start sub feature may be calculated on a month-to-month basis and used to generate a report to demonstrate the continued savings of the system.

A second sub-feature of the light scheduling application 1351 may include a Light Sweeping process. Unlike mechanical systems, facilities, such as commercial or industrial, do not have a system that shuts the lights off at the end of the day. In fact, a mechanical system may be programmed to a set-back mode at night. However, with lighting, as soon as the last person leaves the building, the cleaning company usually occupies the building for approximately four to five hours based upon the cleaning crew's schedule. As such, the lighting in the building may stay on until the cleaning company is finished. Thereafter, the lights are shut off. Based upon this scenario, the lights in a building are being operated an extra four-to-five hours per day. Light Sweeping is a technique of the wireless internet lighting control system in which all the lights in the building are "swept off", i.e., turned off in a first portion of the building and gradually continued to other portions of the building, at the close of the business day. The Wireless Internet Lighting Control System (WILCS) will systematically shut down all the lighting in the building and then make sure the lights are off by a certain time through the night. The WILCS further has the intelligence to calculate the amount of energy being saved by the customer through the Light Sweeping process. Further, the WILCS can calculate the savings and translate the savings as a result of keeping the lights off throughout the building. The savings due to the Light Sweeping process may be calculated on a month-to-month basis, and used to generate a report to demonstrate the continued savings of the system.

With regard to the energy monitoring application 1355, through the wireless ballast control module 902, the wireless internet lighting control system (WILCS) can monitor and control the amount of power consumption for the lighting system. Through a direct interface with macro control systems such as Omni-Link System of Powerweb, Inc., described in U.S. Pat. No. 6,311,105 and U.S. Pat. No. 6,122,603, hereby incorporated by reference, the energy from an electric meter as well as the cost of electricity in the market may be monitored. The energy monitoring application 1355 may calculate monthly performance statistics on how much energy was saved by using the WILCS 900. In addition, the system will monitor the price of power and allow the end user to automatically shed load in order to reduce power consumption to save on a real-time price rate or participate in a demand response event. The load and reduction statistics will be transmitted to the system, stored in the load management database 1357 and be available to allow customers to predetermine the financial benefit of reducing lighting load and/or participating in load response.

With regard to the Zone Control application 1359, because of the digital addressable configuration of the wireless ballast control module 902, each light fixture or ballast can be wirelessly grouped and/or zoned with other fixtures to form virtual zones within a building. The operator of the internet ASP control center 908 can assign different zones to various occupants throughout a facility. A group of fixtures or ballasts can be controlled or a single, individual fixture may be controlled via the wireless internet interface. The internet ASP control center 908 further includes the capability to design and format an entire facility from the internet. A facility may be entered into the internet ASP control center 908 and the WILCS will activate the user or groups of users within the building.

With regard to the Load Management application 1357, the wireless internet lighting control system offers the facility operator permanent load reduction in their energy costs. The wireless internet lighting control system in conjunction with a system such as the Omni-Link system may monitor the price of power in the market and modify the lighting system to offer consumers reduced load profiles and cheaper electricity prices as illustrated in the screen shot of FIG. 4.

With regard to the Maintenance application 1353, the wireless internet lighting control system offers two-way feedback to the internet ASP control center 908. The wireless ballast control module 902 is designed to detect various currents in the ballast to determine maintenance issues within the lighting system, as illustrated in FIG. 3. The wireless internet lighting control system will send an alarm to an operator in the event of a lamp failure or ballast failure, and will also send the location of the lamp failure.

Figure 14A:
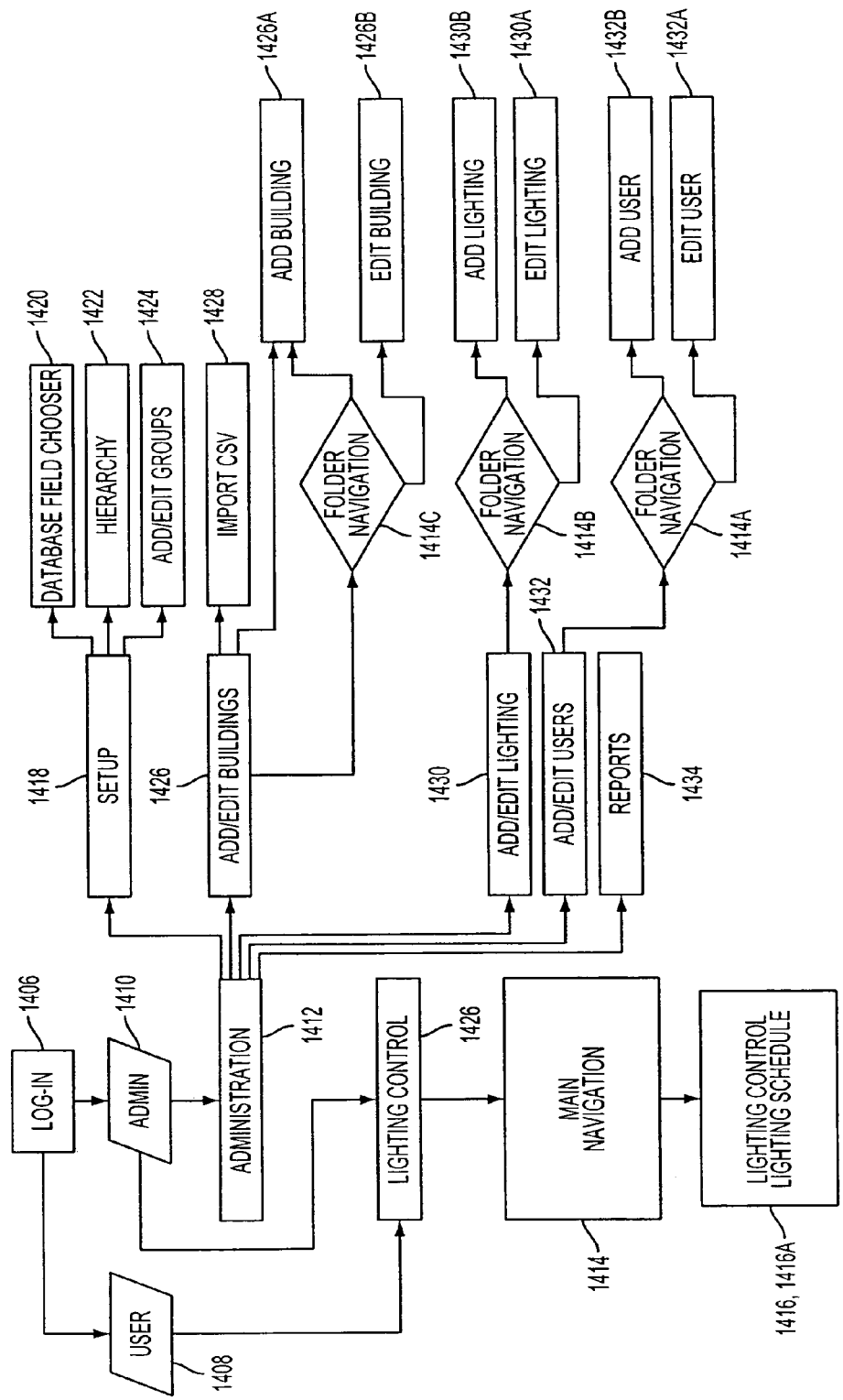
FIG. 14A illustrates processes of the lighting software of the wireless lighting control system in accordance with an embodiment of the present invention.

FIG. 14A illustrates lighting software logic and processes for the ASP control center in accordance with an embodiment of the present application.

At 1406, the system is designed to have all proper log-in tools for end users as well as administrators. The Log-in page prompts a user for log-in and password information. User and password information will be generated and distributed manually by an Administrator. Upon successful log-in, the user is redirected to the Administrative Control Center as illustrated in FIG. 2. If log-in is unsuccessful, the log-in page is redisplayed with an error message. If the user is an Administrator and the log-in is successful, the user is granted access to the Administrative link.

At 1408, the user is defined on the system as an end user person who has a password and can control an individual lighting system or a particular zone lighting control on the system. User and password information will be generated and distributed manually by an Administrator.

Figure 14B:
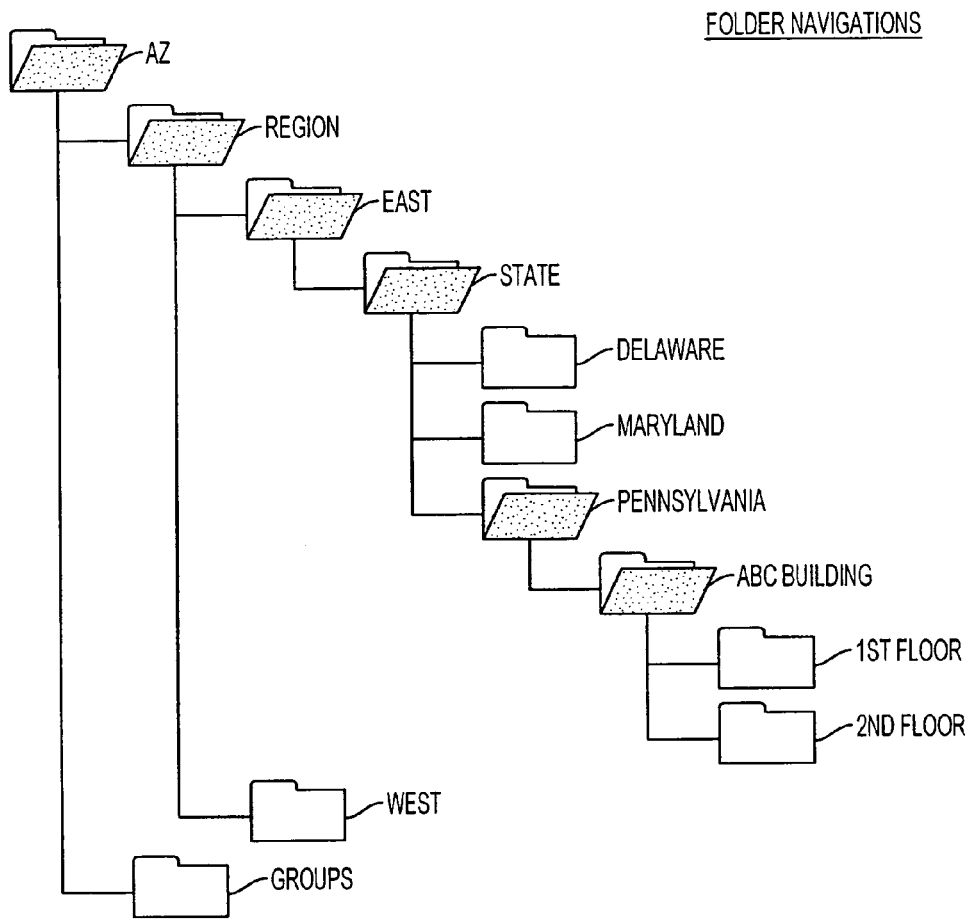
FIG. 14B illustrates the folder navigation of the lighting software in accordance with an embodiment of the present invention.

At 1414, 1414A, 1414B, 1414C, navigation tools allow the user to navigate through all aspects of the system and at all levels of control. All forms created on the system will result in the display of a confirmation, before final submission. Navigation to buildings (edit or control), Lights (add, edit or control) or users (add or edit) will be via a list display containing hyperlinked headers for resorting buildings by column. A limited number of records will be displayed, with start/end/next/previous links for navigating list. Folder GUI display using stored hierarchy will display subfolders/buildings as folders are clicked. Administrator can link at any GUI level to access all administrative functions and set temporary levels, and set schedules. FIG. 14B illustrates the folder diagram and layout of the folder navigation for 1414A, 1414B and 1414C.

Returning to FIG. 14A, at 1410, the software administrator can set up all the administration functions on the system. The administration functions include design and edit buildings, zones, groups, lights, schedules and light intensity on the system.

At 1412, the software administration will allow the administrator to select and set up fields that will be used throughout the application. These fields set up the administrative functions for the platform. Default fields will be listed in form with select boxes for selection, while custom fields will contain text input boxes for custom names. Settings will be stored in a table in the database. The administration information that may be stored in the database may include: Building Name, Street Address, City, State, Zip, Contact Name, Contact Phone Number, Contact E-mail address, Lighting unit address, Lighting unit floor, Lighting unit zone, Lighting unit Common Name, Custom field 1 (Example: Region, Zone), Custom field 2, and Custom field 3, as illustrated in FIGS. 6 and 7.

At 1416, the system will be designed to schedule lighting by: selecting the hierarchy level, building, or lighting unit through list or folder navigation; selecting times and lighting levels (i.e., 4 weekday settings, 4 weekend settings), selecting sunrise and sunset for each configuration as shown in FIG. 14C. Separate schedules may be set for each lighting unit, or set for any point in hierarchy, or group. Changing schedules for group or hierarchy levels will replace previous schedules set for individual/group, or hierarchy level lighting units.

At 1416A, the system will be designed to control and schedule lighting by: selecting the hierarchy level, building, or lighting unit through list or folder navigation, selecting lighting level desired. Level will return to scheduled level at next scheduled level change. The Administrator may set temporary lighting level(s) for any point in hierarchy and may use temporary override to lock out users ability to change lighting levels.

At 1418, the Set Up field is the field that sets the criteria for a data field chooser, the hierarchy, and the multiple building groups on the system. The set up 1418 sends stored information to be sorted back into the database for logic decisions.

At 1420, the Field Chooser will allow the administrator to select and set up fields that will be used throughout the application. Default fields will be listed in form with select boxes for selection, while custom fields will contain text input boxes for custom names. Settings will be store in a table in the database. Field chooser information stored in the database may include: Building Name, Street Address, City, State, Zip, Contact Name, Contact Phone Number, Contact E-mail address, Lighting unit address, Lighting unit floor, Lighting unit zone, Lighting unit Common Name, Custom field 1 (Example: Region, Zone), Custom field 2, and Custom field 3.

At 1422, the system is designed to automatically set up a hierarchy in the system. The hierarchy is set up by a form that will ask how many levels (or additional levels) of control are desired. The Administrator is presented with a form containing a dropdown boxes for each level of control desired. The dropdown boxes will contain selections designated by the field chooser. (Example: Region, State, Zip) The selected setting will be stored in a table in the database. Once these updates are made, the changes are stored in the navigation menu.

At 1424, an Administrator can create groups containing one or more buildings as members. The Administrator can add and remove buildings from a group. Buildings can be in multiple groups. A list of groups will contain buttons/links to edit/delete. A display button/link at the bottom of the page will be there to add a new group. Add/Edit group forms will contain dropdown boxes containing distinct query results from database as designated by the field chooser. For example a zip code dropdown box will contain all distinct zip codes. Once these updates are made these changes are stored in the navigation menu.

At 1426, 1426A, and 1426B, an Administrator can ADD or EDIT a building on the system by selecting the appropriate information from the drop down menu and entering this information into the system. The Administrator can add and remove buildings from the system. List of Buildings will contain buttons/links to edit/delete. A display button/link at the bottom of the page will be there to add new group. Add/Edit Building forms will contain dropdown boxes containing distinct query results from database as designated by the field chooser. Add/Edit Building form will contain text box inputs for fields as designated in the field chooser Top of Form Building Name, Street Address, Region, City, State, Zip, Contact Name, Contact Phone Number, Contact E-mail address, Custom field 1 (e.g., Region, Zone). Once these updates are made these changes are stored in the navigation menu.

At 1428, the import CSV is the interface to the other pricing and load management applications on the system. This function acts as a two way control that sends load data and energy price data into the system in order for the administrator to decide if it is an a appropriate time to shed load.

At 1430, 1430A and 1430B, an administrator can ADD or EDIT Lights on the system by selecting the appropriate information from the drop down menu and entering this information into the system. A list of selected buildings are available through list or folder navigation. The Add/Edit Lighting form will contain text box inputs for fields as designated in the field chooser and will also input changes from the Edit side and save the new data within the database. The Add/Edit Lighting form will contain text box inputs for fields as designated in the field chooser such as Lighting unit floor, Lighting unit zone, Lighting unit, and Common Name.

At 1432, 1432A and 1432B, users may be added or edited by: selecting the building through a list or folder navigation, selecting the appropriate lighting control for any hierarchical level, building or light level and selecting the form with the context box inputs designated from the Database field chooser.

At 1434, the reports system is the feedback system that generates the reports back on the system for diagnostic and maintenance items that are picked up on the system. These maintenance items are sent to the reports link and reports are generated by the system detailing the maintenance items on the system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A lighting control system for managing utility operation parameters comprising:
   a ballast control module configured to communicate with a lighting ballast, the ballast control module including:
      a potentiometer arranged to generate signals, voltages and resistances to operate the lighting ballasts;
      a microcontroller arranged to convert internet protocol to local area network protocol and vice versa, and to control traffic flow, data storage and logic of the ballast control module; and
      an RF radio cartridge decoder arranged to connect portions of the ballast control module to the communications link, wherein the RF radio cartridge transmits data at multiple frequencies at both fast and slow transfer rates;
   a data processing module connected to the ballast control module via a wireless communications link; and
   a wireless internet control center wirelessly connected to the ballast control module via the data processing module and arranged to operate a plurality of utility operation applications.

2. The lighting control system of claim 1, further comprising a plurality of repeaters connected to the data processing module.

3. The lighting control system of claim 1, wherein the communications link between the data processing module and the ballast control module is a local area network.

4. The lighting control system of claim 1, wherein the communications link between the data processing module and the ballast control module is a wide area network.

5. The system of claim 1, wherein the ballast control module is connected to the lighting ballast via a low voltage interface.

6. The system of claim 1, wherein the ballast control module is connected to the lighting ballast via a power line carrier.

7. The system of claim 1, wherein the ballast control module is connected to the lighting ballast via a digital addressable lighting interface (DALI).

8. The system of claim 1, wherein the lighting ballast includes fluorescent ballasts and high intensity ballasts.

9. The system of claim 1, wherein the lighting ballast is electronic.

10. The system of claim 1, wherein the lighting ballast is magnetic.

11. The system of claim 1, wherein the ballast control module is integrated directly into the lighting ballast.

12. The system of claim 11, wherein the lighting ballast supplies power to the ballast control module.

13. The system of claim 1, wherein the ballast control module includes a maintenance feedback portion to monitor and provide alerts when there is a ballast or lamp failure.

14. The system of claim 1, wherein the microcontroller further processes commands received by the lighting ballast and the data processing module.

15. The system of claim 1, wherein the ballast control module further comprises:
   a dimming control configured to directly control light intensity of the lighting ballast; and
   a switching mechanism arranged to provide power to the lighting ballast; and
   a transformer arranged to supply a low power voltage to the dimming control and a high power voltage to the switching mechanism.

16. The system of claim 15, wherein the switching mechanism is a solid state switch or electronic triac.

17. The system of claim 16, wherein the switching mechanism is arranged for high frequency switching to indirectly vary the light intensity of the lighting ballast.

18. The system of claim 1, wherein the data processing module includes:
   a communications cartridge encoder adapted to provide secure transmission of data from the wireless internet control center via the communications link;
   a microcontroller arranged to convert wireless WAN transmissions from the wireless internet control center to LAN transmissions for forwarding to the ballast control module; and
   a wireless WAN TCPIP gateway arranged to connect the data processing module to the internet control center.

19. The system of claim 18, wherein the microcontroller includes an embedded operating system for local operation of the system.

20. The system of claim 18, wherein the microcontroller includes an embedded RAM chip containing scheduling functions for local operation of the lighting ballasts.

21. The system of claim 1, wherein the wireless internet control center includes:
   a network operation center adapted to wirelessly connect the wireless internet control center and the wireless data processing module;
   a database server arranged to manage system information; and
   an applications server containing at least one utility operation application configured to operate the lighting system.

22. The system of claim 21, wherein the at least one application includes at least one of light scheduling, zone grouping of the lighting ballasts, energy monitoring, load management, maintenance, and light intensity.

23. The system of claim 22, wherein the light scheduling application includes one of a lighting ramp-start process and a light sweeping process.

24. The system of claim 22, wherein the energy monitoring application monitors and controls the power consumption of the lighting system.

25. The system of claim 21, wherein the system information includes building information, lighting zone control information, user names, and passwords.

* * * * *